Oct. 24, 1950     O. E. BRASWELL     2,526,799
FLEXIBLE SHAFT COUPLING
Filed April 15, 1948
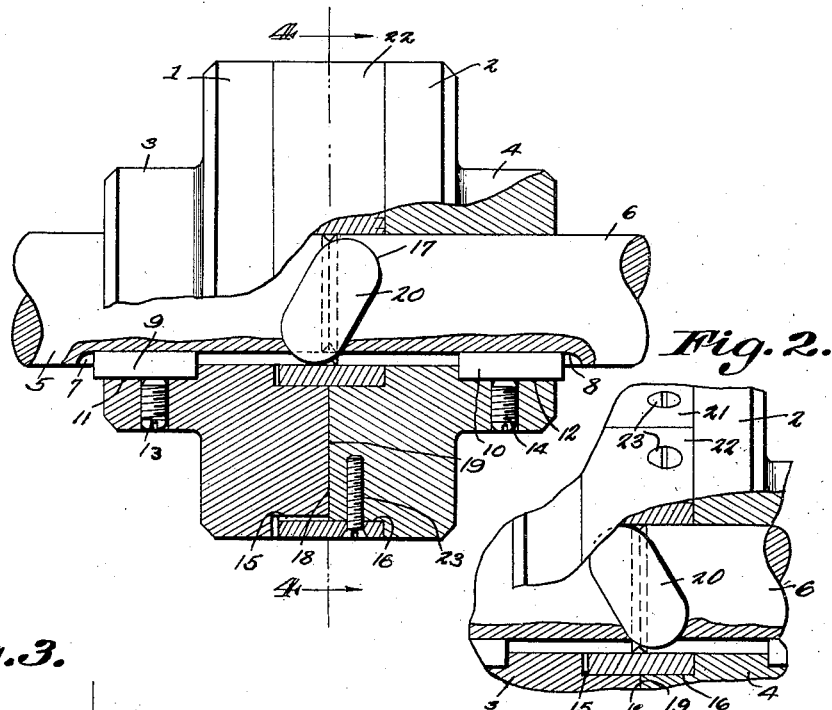
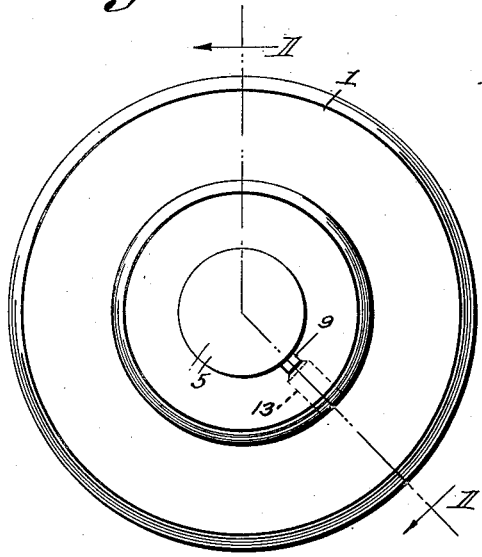
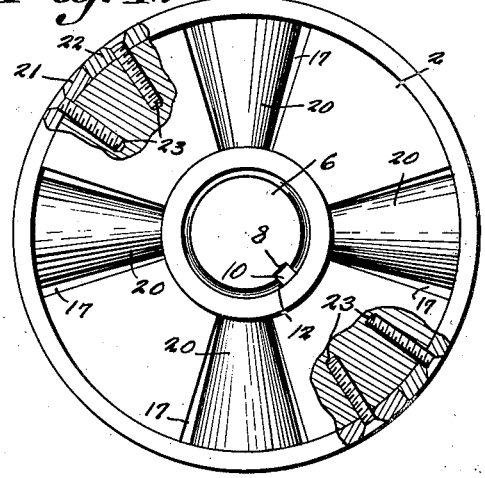
Opie E. Braswell
INVENTOR
BY C. A. Snow & Co.
ATTORNEYS.

Patented Oct. 24, 1950

2,526,799

UNITED STATES PATENT OFFICE 2,526,799

FLEXIBLE SHAFT COUPLING

Opie E. Braswell, Hattiesburg, Miss.

Application April 15, 1948, Serial No. 21,172

1 Claim. (Cl. 64—14)

This invention relates to improvements in shaft couplings.

An object of the invention is to provide an improved flexible shaft coupling including cooperating coupling bushings adapted to be secured to the adjacent ends of two aligned shafts, together with a plurality of radially disposed coupling blocks of fiber, and a pair of cooperating semi-circular hold down straps for said coupling blocks secured to the peripheral edge of one of said coupling bushings.

Another object of the invention is to provide an improved flexible shaft coupling including a pair of cooperating coupling bushings adapted to be fixed to the adjacent ends of two aligned shafts, together with a plurality of radially and angularly disposed coupling blocks of fiber between said coupling bushings, said coupling bushings being peripherally grooved to provide different diameters, and a pair of cooperating semi-circular hold down straps for said coupling blocks secured to the larger and more shallow peripheral groove in one of said coupling bushings.

A further object of the invention is to provide an improved flexible shaft coupling construction which will be highly efficient in operation, and relatively inexpensive to manufacture and produce.

Other objects will appear as the description proceeds.

In the accompanying drawings which form a part of this application,

Figure 1 is a sectional view taken on the line 1—1 of Fig. 3;

Fig. 2 is a detail sectional view showing the angular positioning of one of the fiber blocks with the hold down straps therefor;

Fig. 3 is an end view of the improved flexible shaft coupling, and

Fig. 4 is a sectional view taken on the line 4—4 of Fig. 1.

Like characters of reference are used throughout the following specification and the accompanying drawings to designate corresponding parts.

In carrying out the invention, there is provided an improved flexible shaft coupling including a pair of cooperating coupling bushings 1 and 2 having reduced outer end portions 3 and 4 respectively, said bushings being axially apertured to snugly fit over the adjacent ends of the aligned shafts 5 and 6.

Alignable splines 7 and 8 are formed in the ends of the shafts 5 and 6 to receive the short keys 9 and 10 supported in the splines 11 and 12 formed in the coupling bushings 1 and 2.

Set screws 13 and 14 are threaded through the reduced outer end portions 3 and 4 for engaging the edges of the keys 9 and 10 for locking the keys and coupling bushings 1 and 2 upon said shafts 5 and 6.

The adjacent peripheral edges of the coupling bushings 1 and 2 are grooved as at 15 and 16, the groove 15 being slightly deeper than the groove 16.

Radially extending angularly disposed slots 17 are formed in the adjacent faces 18 and 19 of the coupling bushings 1 and 2, said slots being substantially oval in cross section and of increasing size from their inner ends to their outer ends. Furthermore the angularly disposed slots 17 are disposed in alternate right angular relation.

Four wedge shaped fiber blocks 20 of oval shape in cross section and tapering inwardly from their outer ends to their inner ends are disposed in the slots 17 to provide a shearing coupling, and when said blocks 20 are worn, the same may be quickly and readily replaced at a minimum of time and expense.

A pair of semi-circular metal hold down straps 21 and 22 are disposed in the peripheral grooves 15 and 16 to overlie the outer arcuate ends of said blocks 20, and are secured in place by the countersunk head screws 23 which extend therethrough and into the coupling bushing 2.

From the foregoing description, it is apparent that a highly efficient flexible shaft coupling has been provided.

While the preferred embodiment of the instant invention has been illustrated and described, it will be understood that it is not intended to limit the scope of the invention thereto, as many minor changes in detail of construction may be resorted to without departure from the spirit of the invention.

Having thus described my invention, what I claim as new and desire to secure by Letters Patent of the United States is:

In a flexible shaft coupling, the combination of a pair of cooperating coupling bushings having parallel contacting surfaces, aligned shafts keyed to said coupling bushings, alternately arranged angularly disposed outwardly tapering radially extending fiber blocks supported between said coupling bushings, adjacent peripheral grooves formed about said bushings, and a pair of cooperating semi-circular metal retaining bands secured to the periphery of one of said bushings overlying the outer ends of said blocks for limiting their outward movement.

OPIE E. BRASWELL.

REFERENCES CITED

The following references are of record in the file of this patent:

UNITED STATES PATENTS

| Number | Name | Date |
|---|---|---|
| 292,095 | Carlson | Jan. 15, 1884 |
| 1,796,803 | Nelson | Mar. 17, 1931 |
| 2,050,630 | Reid | Aug. 11, 1936 |

FOREIGN PATENTS

| Number | Country | Date |
|---|---|---|
| 111,126 | Australia | 1928 |
| 430,981 | Germany | 1926 |